Figure 1:
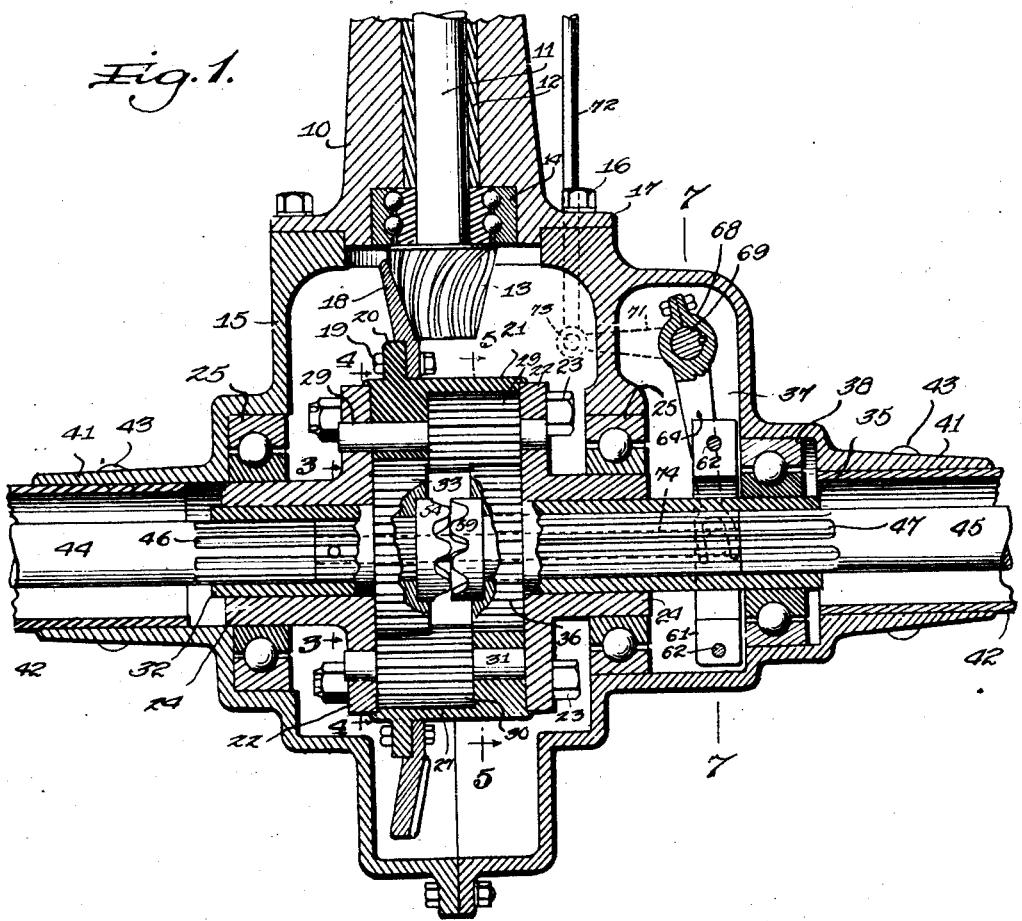

Nov. 6, 1928.                          1,690,189
R. L. DENNISON
DIFFERENTIAL GEARING
Filed June 2, 1927        2 Sheets-Sheet 1

Inventor
ROBERT L. DENNISON
By
Attorney

Nov. 6, 1928.

R. L. DENNISON

DIFFERENTIAL GEARING

Filed June 2, 1927

1,690,189

2 Sheets-Sheet 2

Inventor
ROBERT L. DENNISON
By
Attorney

Patented Nov. 6, 1928.

1,690,189

UNITED STATES PATENT OFFICE.

ROBERT L. DENNISON, OF KANSAS CITY, MISSOURI.

DIFFERENTIAL GEARING.

Application filed June 2, 1927. Serial No. 196,090.

This invention relates to a differential gearing and more particularly to such a device for motor vehicles provided with means for locking the axle sections together to rotate positively as a unit.

An important object of the invention is to provide a differential gearing having novel means for locking the rear axle sections together whereby they may be caused to rotate as a unit when desired.

A further object is to provide a differential of the character referred to wherein the locking action is effected without placing severe strains on the working parts of the device.

A further object is to provide gearing of the character mentioned, the locking means including a pair of relatively movable members each secured to one of the axle sections to rotate therewith whereby the relatively movable members may be easily brought into engagement with each other while the vehicle is moving without subjecting any of the parts of the device to sudden strains.

A further object is to provide locking means for a differential wherein such means is wholly inoperative during the normal operation of the vehicle that is wherein the locking means form no portion of the driving elements between the differential pinion and the axle sections, so that the locking means is not subjected to any strain whatever during the normal operation of the gearing.

A further object is to provide a device of the above mentioned character wherein end thrusts of the axle sections are prevented by novel means from being transmitted to the working parts of the device, thus positively eliminating any chance of the elements of the device becoming jammed and inoperative.

Other objects and advantages of the invention will be apparent during the course of the following description.

Figure 3:
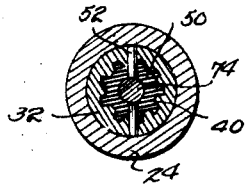
Figure 2:
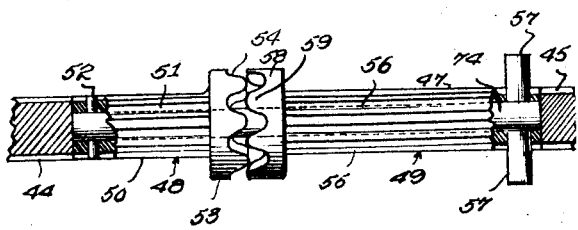
Figure 4:
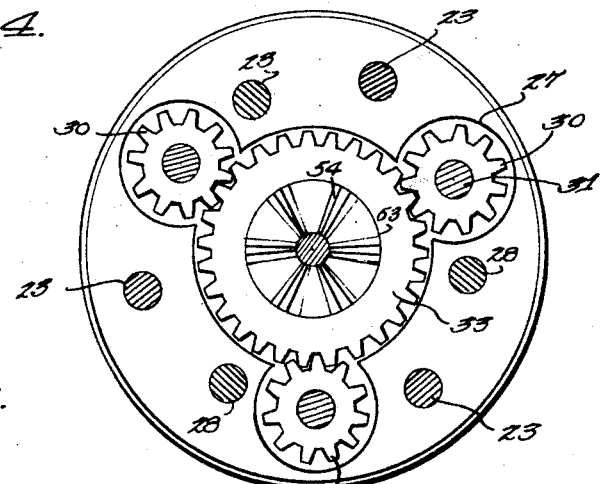
Figure 6:
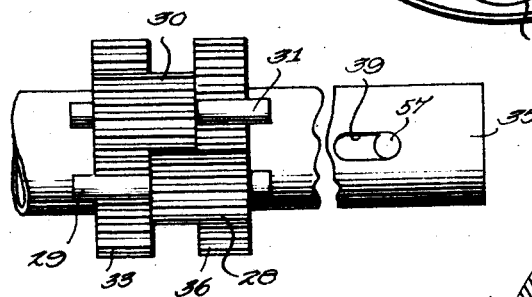
Figure 5:
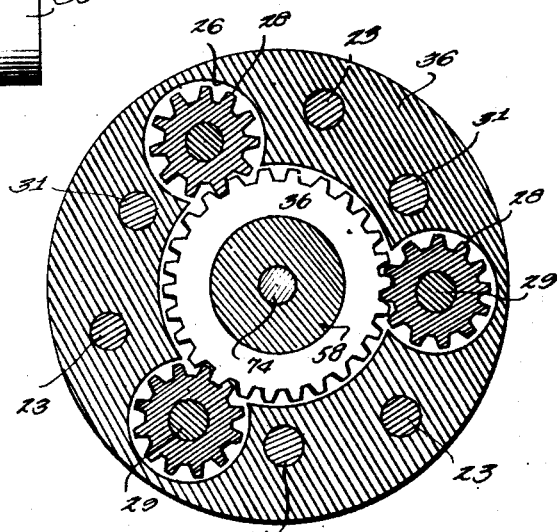
Figure 7:
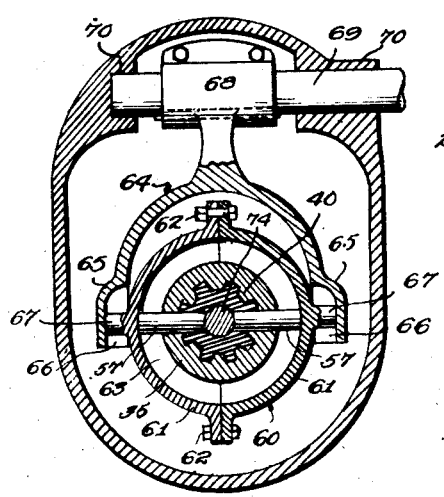

In the drawings I have shown one embodiment of the invention. In this showing,

Figure 1 is a central horizontal sectional view through the device, parts being shown in elevation, Figure 2 is a detail elevation of the locking means and associated elements, parts being shown in section, Figure 3 is a detail section on line 3—3 of Figure 1, Figure 4 is a similar view on line 4—4 of Figure 1, Figure 5 is a similar view on line 5—5 of Figure 1, Figure 6 is a detail elevation of a portion of the gearing and associated elements, and Figure 7 is a section on line 7—7 of Figure 1.

Referring to the drawings, the numeral 10 designates the usual transmission shaft housing through which the transmission shaft 11 extends, a bushing 12 preferably being arranged in the housing to receive the shaft. A differential drive pinion 13 is secured to the rear end of the shaft 11 as shown in Figure 1. The housing 10 is preferably provided adjacent the pinion with ball bearings 14 of any preferred type.

A differential housing 15 is arranged rearwardly of the shaft housing 10, and these elements are secured together by bolts 16 passing through flanges 17 formed on the rear end of the housing 10.

A bevel gear 18 meshes with the pinion 13, and this gear is secured by bolts 19 to an annular flange 20 surrounding a gear cage 21. The cage is secured to end plates 22 by bolts 23, and the end plates are provided with longitudinally extending sleeve portions 24 preferably journaled in ball bearings 25 carried by the differential housing 15.

Each side of the cage 21 is provided with a plurality of equidistantly spaced substantially circular recesses 26 and 27 as shown in Figures 1, 4 and 5, these recesses being off-set circumferentially with respect to each other and having their inner ends overlapping for a substantial distance as indicated in Figure 1. A relatively long pinion 28 is mounted in each recess 26 and is carried by a shaft 29 journaled in the gear cage 21 and in the plates 22. A similar set of pinions 30 are mounted in the recesses 27 and are carried by shafts 31 also journaled in the gear cage and in the plates 22. The inner ends of the gears 28 and 30 overlap each other as shown in Figures 1 and 6, and each of the gears 28 meshes with one of the gears 30 as will be apparent.

A sleeve 32 is rotatably mounted in the sleeve portion 24 of one of the plates 22, and a gear 33 is carried by the inner end of the sleeve 32. This gear meshes with each of the gears 30 as shown in Figure 4. A similar but materially longer sleeve 35 is journaled in the other sleeve portion 24 and is provided at its inner end with a gear 36 meshing with each of the gears 28 as shown in Figure 5. The casing 15 is provided outwardly of the bearing 25 with a chamber 37, and outwardly of this chamber another ball bearing 38 is arranged and adapted to rotatably support the outer end of the sleeve 35. Longitudinal diametrically opposite slots 39 are formed in the sleeve 35 for a purpose to be described. Each of the sleeves 32 and 35 is provided with interior longitudinally extending ribs 40 to form splined connections to be referred to later.

Opposite sides of the differential housing are provided with aligned substantially tubular extensions 41 in which the inner ends of axle housings 42 are arranged, and these elements may be secured together by rivets or the like 43. Axle sections 44 and 45 are mounted in the axle housings and extend into the differential housing as shown in Figure 1. The inner end of the axle section 44 is provided with spline grooves 46 to receive the ribs 40 of the sleeve 32, and the inner end of the axle section 44 terminates outwardly of the inner end of the sleeve 32 for a purpose to be described. Similarly the inner end of the axle section 45 is provided with spline grooves 47 to receive the ribs 40 of the sleeve 35. It will be apparent that the splined connections referred to form positive drive means between the sleeves 32 and 35, and the respective axle sections.

Referring to Figures 1 and 2, the numerals 48 and 49 indicate locking devices as a whole. The device 48 comprises a sleeve portion 50 having spline grooves 51 on its outer surface receiving the ribs 40 of the sleeve 32. In order to prevent longitudinal movement of the sleeve 50 with respect to the sleeve 32, radial pins 52 are preferably employed. It will be apparent that the locking device 48 is positively connected to the axle section 44 through sleeve 32, to rotate therewith. The inner end of the device 48 is provided with a head 53 upon the inner end of which are formed relatively large heavy teeth 54.

The locking device 49 comprises a relatively long sleeve 55 having spline grooves 56 extending throughout the length of its outer surface and adapted to slidably receive the ribs 40 of the sleeve 35. The sleeve 55 is provided at its outer end with diametrically opposite outwardly extending pins 57 which extend through the grooves 39 as indicated in Figure 6. The inner end of the sleeve 55 is provided with a head 58, similar to the head 53, and the head 58 is provided on its inner end with coacting teeth 59 adapted to engage the teeth 54 to form positive clutch means between the sleeves 50 and 55.

As shown in Figures 1 and 7, a collar 60 surrounds the sleeve 35 adjacent the pins 57, the collar preferably being formed of complementary sections 61 secured together by bolts 62. The collar 60 is provided with an internal annular groove 63 in which the radial pins 57 are adapted to revolve. A forked shifting member 64 is arranged above the collar 60 and is provided with depending arms 65 having vertical grooves 66 therein to receive outwardly extending pins 67 preferably formed integral with the complementary sections 61. The collar 60 and shifting member are arranged in the chamber 37 as clearly shown in Figure 1. The upper end of the shifting member is provided with a collar 68 keyed to an oscillating shaft 69, the latter shaft being journaled in bearings 70 formed in the differential housing. An arm 71 is connected to one end of the shaft 69, and an operating rod 72 is pivotally connected to the free end of the arm 71 as at 73.

Means is provided to take up inward thrust of the axle sections 45 to prevent damaging of the operating elements of the device. Referring to Figures 1 and 2 of the drawings, the numeral 74 designates a thrust pin which extends through the sleeves 50 and 55 and contacts at its ends with the axle sections 44 and 45. The pin is preferably made of hardened steel, and being straight and rigid, prevents inward movement of the axle sections beyond the position shown in Figure 1. No undue inward movement therefore can be transmitted to any of the parts of the device to cause such parts to jam or become injured.

The operation of the device is as follows:

The shaft 11 is driven in the usual manner, and the gear cage 21 will be rotated about the axes of the axle sections by the meshing of the gears 13 and 18. This action causes the gears 28 and 30 to travel in orbits concentric to the axle sections as will be apparent. As previously stated, the sets of gears 28 and 30 mesh with each other and with the gears 33 and 36 respectively, and since the latter gears are positively connected to the axle sections through the splined connections of the sleeves 32 and 35, it will be apparent that rotative movement will be imparted to the axle sections. When the vehicle is traveling in a straight line whereby the axle sections rotate at the same speed, there will be no rotation of the pinions 28 and 30 about their own axes. When the vehicle is turning corners or being operated under any other conditions which will cause differential rotative action between the wheels of the vehicle, the differential rotation will be compensated for by the rotation of the pinions 28 and 30 about their own axes. The operation of the elements described is the same as in the usual types of differentials and will be readily apparent. During the normal operation of the differential the locking heads 53 and 58 will be disengaged from each other and these lements will rotate with their respective axle sections. It will be apparent that the locking devices are wholly independent of the differential since they form no portion of the driving train between the pinion 13 and the axle sections. The locking means therefore will be subjected to no strains or wear when the differential is being operated under normal conditions. When one of the rear wheels of the vehicle is running over slippery surfaces thus permitting it to spin, it is desired to lock the axle sections together to positively drive both wheels. Under such conditions, the rod 72 is moved forwardly by any suitable operating means thus locking the shaft 69 and swinging the arms 65 inwardly. This action causes the collar 60 also to be moved inwardly carrying with it the pins 57. These pins are slidable in the slots 39 and inward movement of the pins causes the locking device 49 to be moved inwardly whereby engagement will take place between the teeth 54 and 59. As previously stated, the sleeves 50 and 55 of the locking devices are splined to the sleeves 32 and 35, while the latter elements positively rotate with the axle sections, and accordingly it will be apparent that when the teeth 54 and 59 are brought into engagement the axle sections will be positively locked together to rotate as a unit. The locking means readily may be disengaged merely by pushing the rod 72 rearwardly thus sliding the sleeve 55 outwardly and disengaging the teeth 54 and 59. The thrust pin 74, as previously stated, contacts at its ends with the inner ends of the axle sections and since the pin 74 is straight and rigid it will be apparent that inward movement of the axle sections is positively limited to the positions shown in Figure 1. Thus no inward thrust movement of the axle sections can be transmitted to the operating elements of the transmission or locking device to cause any jamming of the parts or injury thereto, or to cause accidental engagement between the teeth 54 and 59.

It is to be understood that the form of the invention herewith shown and described is to be taken as a preferred example of the same and that various changes in the shape, size, and arrangement of parts may be resorted to without departing from the spirit of the invention or the scope of the subjoined claims.

I claim:

1. A device of the character described comprising a drive shaft, a pinion carried thereby, a ring gear meshing with said pinion, a pair of sets of pinions carried by said ring gear and rotatable in circular orbits about the axis thereof, each pinion of one set meshing with one of the pinions of the other set, a pair of gears each meshing with the pinions of one set, a pair of axle sections secured respectively to the gears of said pair, a locking device secured against rotation with respect to one gear of said pair, a second locking device secured against rotation but longitudinally slidable with respect to the other gear of said pair, a thrust member extending through and rotatable with respect to said locking devices, the ends of said thrust member contacting with the inner ends of said axle sections, and means for sliding said last named locking device longitudinally with respect to said last named gear to bring it into engagement with said first named locking device, said locking devices cooperating with but forming no part of the drive means comprising said pair of gears.

2. A device of the character described comprising a drive shaft, a pinion carried thereby, a ring gear meshing with said pinion, a pair of sets of pinions carried by said ring gear and rotatable in circular orbits about the axis thereof, each pinion of one set meshing with one of the pinions of the other set, a pair of gears each meshing with the pinions of one set, a locking device including a sleeve secured against rotation with respect to one gear of said pair, a second locking device including a sleeve secured against rotation but longitudinally slidable with respect to the other gear of said pair, a pair of radial pins carried by and extending outwardly from said last named sleeve, a pair of axle sections, a pair of elongated sleeves, said gears of said pair being secured respectively to said elongated sleeves, said elongated sleeves being respectively secured to said axle sections and to the sleeves of said locking devices, said locking devices being arranged coaxial with respect to said axle sections and provided on their inner ends with coacting teeth, a collar surrounding said pins and provided with an internal annular groove receiving said pins, means for moving said collar longitudinally with respect to said axle sections, and a thrust member extending through and rotatable with respect to said locking devices, the ends of said thrust member contacting with the inner ends of said axle sections.

3. A device of the character described comprising a drive shaft, a pair of aligned axle sections having their inner ends spaced from each other, differential drive means connected between said drive shaft and said axle sections, a pair of locking devices forming no part of said drive means secured against rotation with respect to said axle sections and extending inwardly of said axle sections coaxially thereof, one of said locking devices being axially slidable with respect to its corresponding axle section to bring it into engagement with the other locking device, and a thrust member extending through and rotatable with respect to said locking devices, the ends of said thrust member contacting with the inner ends of said axle sections.

4. A device of the character described comprising a drive shaft, a pair of aligned axle sections having their inner ends spaced from each other, differential drive means connected between said drive shaft and said axle sections, a pair of locking devices forming no part of said drive means secured against rotation with respect to said axle sections and extending inwardly of said axle sections coaxially thereof, one of said locking devices being axially slidable with respect to its corresponding axle section to bring it into engagement with the other locking device, means for operating said slidable locking device, said locking devices being provided with axial openings extending therethrough, and a thrust pin extending through and rotatable in said axial openings, the ends of said pin contacting with the inner ends of said axle sections.

5. A device of the character described comprising a drive shaft, a pair of alined axle sections having their inner ends spaced from each other, differential drive means connected between said drive shaft and said axle sections, a pair of locking devices secured to said axle sections and extending inwardly of said axle sections coaxially thereof, means for axially sliding one of said locking devices with respect to its corresponding axle section to bring it into engagement with the other locking device, and a thrust member extending through said locking devices, the ends of said thrust member contacting with the inner ends of said axle sections.

In testimony whereof I affix my signature.

ROBERT L. DENNISON.